INVENTOR
ALEC TRUSSELL
BY Frederick E. Hane
ATTORNEY

INVENTOR
ALEC TRUSSELL
BY [signature]
ATTORNEY 3,001,706

APPARATUS FOR CONVERTING DATA FROM A FIRST TO A SECOND SCALE OF NOTATION

Alec Trussell, Letchworth, England, assignor to International Computers and Tabulators Limited, London, England

Filed Dec. 9, 1953, Ser. No. 397,243
Claims priority, application Great Britain Jan. 30, 1953
20 Claims. (Cl. 235—155)

This invention relates to electronic data translating apparatus.

Many computers operate in serial binary notation. It is convenient to be able to operate such a machine from data derived from a record card punched with decimal numbers or from key set data. Alternatively, the input data may be in non uniform notations, such as sterling.

The object of the invention is to enable a number expressed in a first radix or radices of notation in parallel form to be converted to the equivalent number expressed in a second radix of notation in serial form.

The invention will now be described by way of example with reference to the accompanying drawings in which.

*General*

Each digit of the multi-denominational value is recorded as a punched hole in a column of the record card, the position of the hole in the column indicating the value of the digit. When the card is sensed the value will then be represented as a group of electrical impulses, the relative timing of the impulses indicating digital values from 9 to 0. Each impulse will appear on a different line, according to the denominational value. Thus, the input to the translator is in the form of a number of lines, one for each denomination, each line carrying an electrical impulse which is timed in accordance with the digit value.

The translator employs a storage device in which the binary equivalents of 1, 10, 100, etc. are stored, there being one equivalent recorded for each decimal denomination. These stored equivalents are read out as serial pulse trains under control of the electrical impulses representing the decimal value and are summed in a binary accumulator. The equivalent in any denomination of a digit other than one is built up by repeated addition. For example, the binary equivalent of 100 is repeatedly read out and selected 8 times to form the equivalent of 800.

Figure 1:
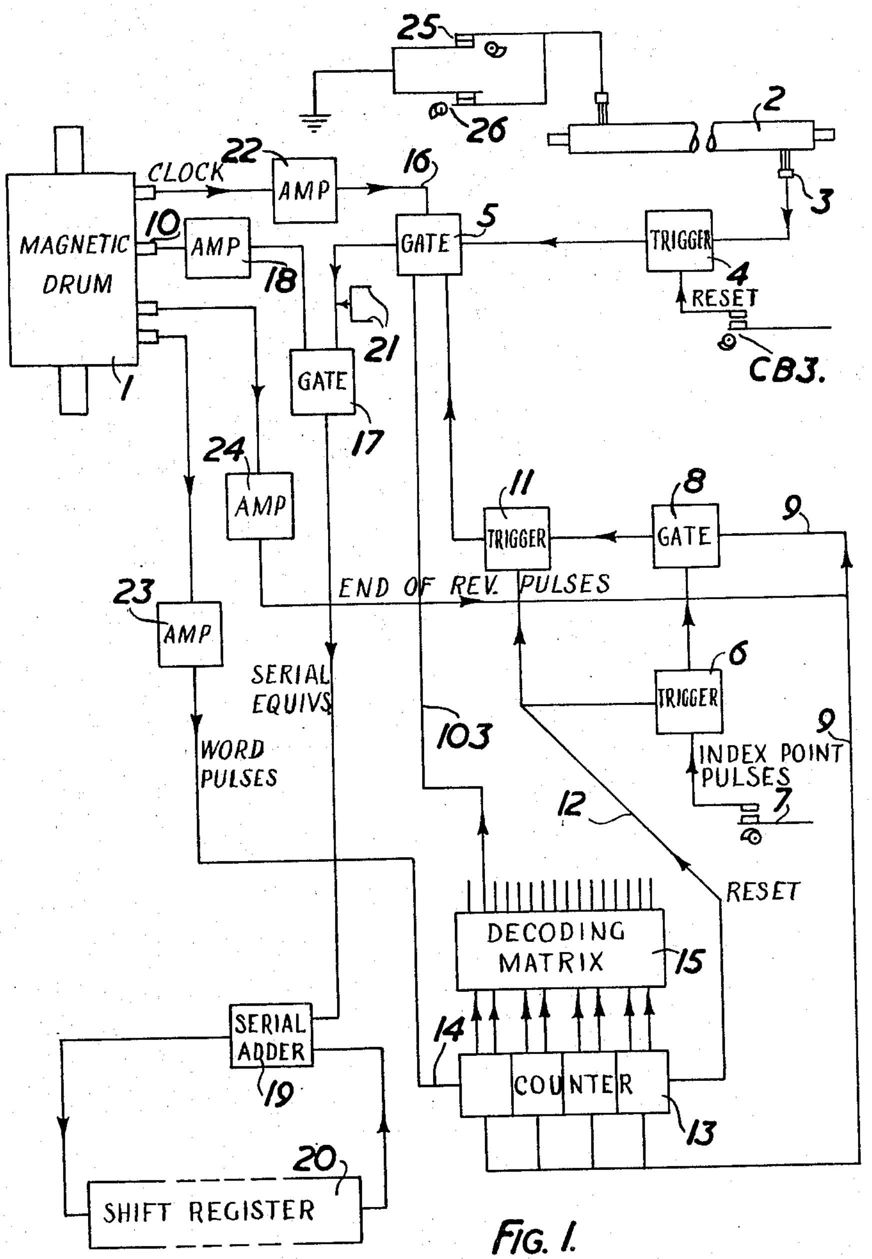
FIGURE 1 is a block diagram of an arrangement for translating a decimal value derived from the electrical sensing of a record card to the equivalent binary value in serial form.

The equivalents are stored on a magnetic drum 1 (FIGURE 1). Conveniently, the drum is of sufficient size to allow all the equivalents to be recorded on a single track. They may be recorded permanently by engraved marks in a similar way to a clock track, or they may be recorded under control of a programme instruction.

The computer operates with a 32-digit binary "word," so that the recorded equivalent of a decimal "1" is the binary value "1" with 31 zeros to the left. The next recorded equivalent on the track will be 1010 with 28 zeros to the left, which is the binary equivalent of 10. The other equivalents are similarly recorded in sequence round the drum.

The card is sensed by a roller 2 and a group of brushes, such as 3. The card is sensed in motion with the 9 position on the card being sensed first. The brush 3 for the tens denomination of the sensing device is connected to a trigger circuit 4, which is normally "Off." When the brush senses a hole in the card the trigger circuit 4 is impulsed to switch it on and thus partially prime a reading control gate 5. The trigger 4 is reset "Off" by cam controlled contacts CB3 at "0" in the card cycle so that the trigger 4 is "On" for the number of index points represented by the value of the hole sensed.

A second trigger circuit 6 is switched on at each index point by closure of contacts 7 which are operated by a cam driven synchronously with the sensing mechanism. When this trigger circuit is "On" it primes a gate 8 which has "end of revolution" pulses applied to it by a line 9. These pulses are derived from the magnetic drum via an amplifier 24 and are timed to occur once in each revolution of the drum and just prior to the reading of the first binary equivalent by the sensing head 10.

The output from the gate 8 switches a trigger circuit 11 which also controls the reading control gate 5. The trigger circuits 6 and 11 are reset before each index point by impulses on a line 12.

Figure 3:
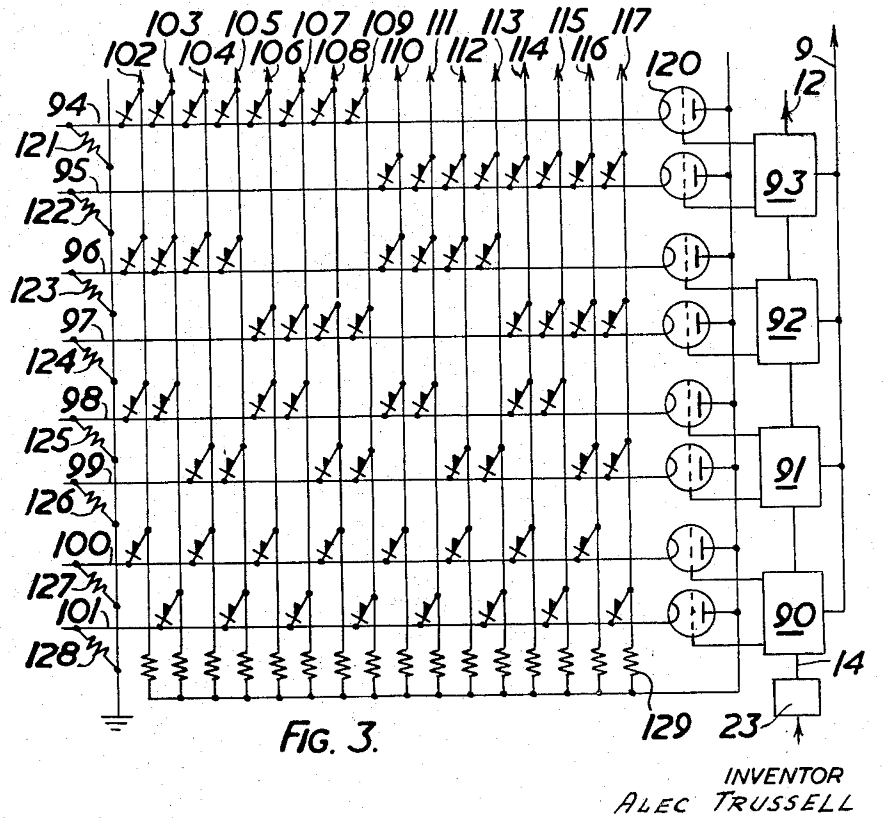
FIGURE 3 is a circuit diagram of the matrix 15.

A four-stage binary counter 13 is operated by impulses on a line 14 which occur once for each word read from the drum. These pulses are derived from a track on the drum and amplified by amplifier 23. The counter advances one after each word and when all the words of a single revolution of the drum have been read out the counter returns to its zero or initial setting and produces a carry on line 12 to operate the reset of the triggers 6 and 11. The anodes of the trigger circuit forming the counter 13 are connected to a decoding matrix 15 in such a way that there are 16 output lines from the matrix, only one of which assumes a potential different from the rest. Thus, the first line 102 (FIGURE 3) is marked when the counter registers "0," the second line is marked when the counter registers "1," and so on. The second output line of the matrix is connected to the reading control gate 5 for the tens denomination. Thus, this gate is controlled jointly by the trigger circuits 4 and 11 and the second output line of the matrix. It also has clock pulses from the drum applied to it on a line 16.

The gate will transmit the clock pulses when the following conditions are fulfilled:

(i) A digit has been sensed in the tens denomination.
(ii) An index point impulse has occurred.
(iii) An "end of revolution" pulse has occurred.
(iv) The counter is registering "1."

A reading gate 17 is jointly controlled by the output from the reading control gate 5 and the pulses derived from the sensing head 10, which are shaped and amplified in an amplifier 18. The output of the reading gate 17 is fed to a binary accumulator comprising a binary adder 19, ring connected with a shifting register 20. Thus, when the four conditions noted above have been fulfilled the gate 5 will be emitting clock pulses during the time when the head 10 is sensing the second word recorded on the equivalents track on the drum 1, that is to say, the binary equivalent of the decimal 10. Thus this word will be fed into the binary accumulator and added to any value which is already registered therein.

Each of the brushes 3 controls a trigger circuit, such as 4. Each such trigger circuit controls a reading control gate which is also controlled by the trigger circuit 11 and the appropriate output line from the matrix 15. The outputs of all these reading control gates are commoned as indicated by the lines 21 to control the reading gate 17. Thus, if several of the trigger circuits 4 are switched "On" during a particular index point, then the corresponding reading control gates will be operated during this index point and will allow the corresponding binary equivalent words to be read serially off the drum 1 and entered in succession into the binary accumulator where they are summed.

The drum 1 is not mechanically synchronised in any way with the card sensing mechanism, so that it must make two complete revolutions in an index point to ensure that the complete set of binary equivalents are available.

Figure 2:
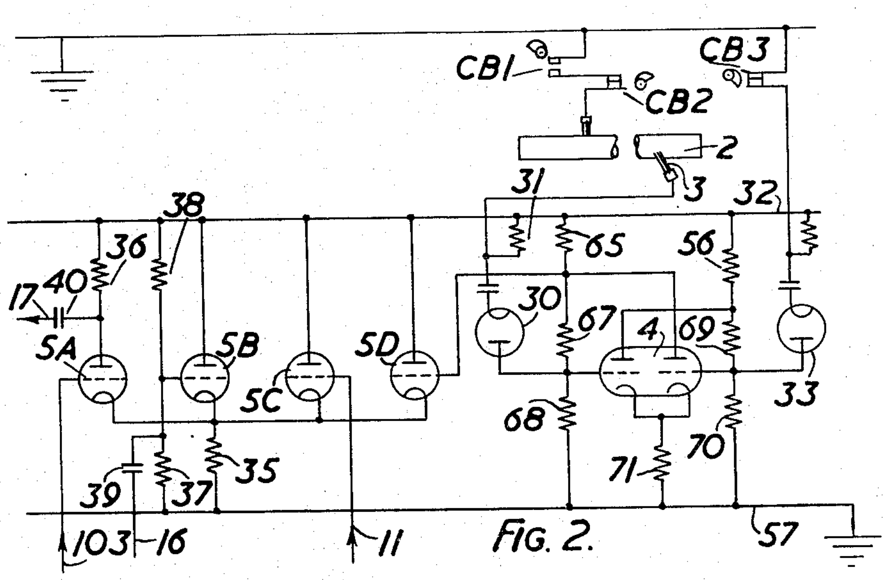
FIGURE 2 is a circuit diagram showing the trigger 4 and gate 5 of the tens denomination.

FIGURE 2 shows details of the card sensing circuit, the trigger 4 and gate 5 of the tens denomination. The sensing roll 2 is connected via circuit breakers CB1 and 2 to earth. The usual card lever contacts (not shown) may be included to prevent sensing in the absence of a card. These cam controlled circuit breakers operate in synchronism with the passage of the card and make as brushes 3 come opposite each index points 9 to 1 in the card being sensed. A brush upon sensing a hole is therefore connected to earth.

*Trigger 4*

The brush 3 is capacitatively connected to the cathode of diode 30 and by resistor 31 to HT positive line 32. The diode is connected to the left grid of the trigger 4. Hence, upon sensing a hole this grid is reduced in voltage by the conduction of diode 30. The other grid of the trigger 4 is connected to a similarly connected diode 33 controlled by CB3 which closes at "0" index point. Hence, trigger 4 is switched "On" at the index point sensed by diode 30 and "Off" at "0" by diode 33.

The trigger 4 is the well known Eccles-Jordan trigger circuit and comprises a double triode having the anodes D.C. cross coupled to the grids to obtain two stable conductive states. The left hand anode is connected to HT positive line 32 through a resistor 56 and to the right hand grid by resistor 69. Likewise, the right hand anode is connected to HT positive line 32 through a resistor 65 and to the left hand grid by a resistor 67. The two grids are connected to earth (HT negative) line 57 by resistors 68 and 70 respectively, the cathodes are connected by resistor 71 to line 57. The convention will be adopted that a trigger is in the "Off" state when the left hand half of the valve is conducting and the right hand half is cut off.

Accordingly, when the trigger 4 is "Off" the left hand grid will be at a potential determined by the potentiometer formed by resistors 65, 67 and 68 and the cathode will be a little above this potential. The potential of the left hand anode is approximately 50 volts and of the right hand anode 100 volts. Consequently, the right hand grid, which is connected to the left hand anode, will be below the cathode potential, maintaining the right hand half of the valve non-conducting.

The trigger is switched from one state to the other by applying a negative pulse of sufficient amplitude to the grid of the conducting half of the valve to cut it off, and thus allow the other half of the valve to conduct.

The trigger 4 is therefore switched "On" at the sensing of an index point and remains "On" until a negative pulse is applied to the right hand grid by an end of card cycle pulse produced by closing of cam operated circuit breaker CB3 at "0." The trigger 4 therefore remains "On" for the number of index points represented by the value of the hole sensed.

The voltage from the right hand anode is applied to grid of triode 5D of the gate 5.

*Triggers 6 and 11*

The triggers 6 and 11 are identical with trigger 4, including the diode switching, in construction. Trigger 6 is switched on by circuit breaker 7 for each index and reset by negative pulses on line 12 before each next index point. Trigger 6 right hand anode voltage conditions gate 8, so that the voltage is low at gate 8 input with trigger 6 "On." Trigger 11 is switched "On" by a negative drum start pulse from gate 8 and is switched "Off" by line 12 connected to the right hand grid. Hence, the trigger 11 is only "On" for one drum revolution for each index point.

*Gate 5*

Gate 5 requires to deal with four inputs, namely, from its associated trigger 4, the trigger 11, the clock pulse derived from the drum on line 16 and the voltage on a line from matrix 15.

The gate comprises four triodes 5A, 5B, 5C, 5D having their cathodes connected in common via resistor 35 to earth line 57. The anode of 5A is connected by resistor 36 to positive line 32. The anodes of 5B, 5C, 5D are all directly connected to positive line 32. The grid of 5B is connected to a potentiometer formed by resistors 37 and 38 connected between lines 32 and 57 holding the grid at 100 volts and hence hold the cathodes close to this voltage. The negative going clock pulse of 50 volts amplitude are applied via condenser 39 to the grid of 5B to cut this valve's current off during clock pulses. The grid of 5C is connected to the right hand grid of T11 and likewise the grid of 5D is connected to the left hand grid of trigger 4. Only when coincidently trigger 4 in "On" (right hand anode voltage low), cutting off conduction in 5D, and trigger 11 is "On," likewise cutting off conduction in 5C, and a negative clock pulse is applied to cut off 5B, can the common cathode potential fall to 50 volts. If the potential derived from the matrix is high (95 volts), valve 5A can conduct, and produce a negative pulse to gate 17 via condenser 40. With the matrix voltage low (48 volts) valve 5A is still cut off with valves 5B, 5C, 5D, non-conducting. Thus the gate produces an output of a negative pulse upon coincidence of one high voltage, one negative pulse, and two low voltages.

The brushes 3, triggers 4 and gates 5 are repeated for each column of entry and the outputs from gates 5 are connected in common to gate 17. Owing to the different matrix line controlling each of the gates corresponding to gate 5, only one gate output can occur at one time and each denomination is converted in succession.

*Gate 8*

Gate 8 corresponds in construction to 5A and 5B. The drum start pulse line 9 is connected to the grid corresponding with 5B and the anode of the trigger 6, which is low when trigger 6 is "Off," is connected to the grid corresponding to 5A.

*Gate 17*

The gate 17 corresponds to gate 5, portions 5A, 5B and 5C, the inputs from amplifier 18 being applied to 5C and 5B to the commoned outputs of gates 5. It differs, however, in having the grid corresponding to 5A at a fixed high potential (98 volts) so held by a potentiometer between lines 32 and 57, so that 5A may conduct upon both triodes 5B and 5C ceasing to conduct.

*Adder 19 and Register 20*

The negative pulses delivered by gate 17 upon coincidence of output pulses from gate 5 and amplifier 18 are added by adder 19 to the contents received from shifting register 20. The adder and shifting register require to operate in the notation employed for the equivalents recorded on the drum 1. With binary translation the binary adder and shifting register are of known form as described in United States patent application Serial No. 344,713 of the same assignee, now Patent No. 2,962,589. The shifting and adding occur in synchronism with the drum equivalents by virtue of clock pulses derived from the line 16.

*Counter 13*

It is assumed there are sixteen columns on the card to be translated and correspondingly sixteen words on one track of a drum. A pulse for each end of word is recorded on the drum and these are read out to line 14 via an amplifier 23 normally biased to cut off so as to produce negative pulses at the anode of the amplifier for each end of word. These pulses are conveyed by line 14 to counter 13. The counter operated by these pulses is of well-known form employing four triggers 90, 91, 92, 93 similar to trigger 4, but interconnected so as to switch the next trigger "On" for every second pulse applied to a preceding trigger, i.e., a left hand anode of a preceding trigger is capacitatively coupled to both grids of a succeeding trigger.

Each of the triggers 90, 91, 92, 93 forming the counting chain are set to their "off" or "0" indicating state by and "end of revolution" pulse derived from the drum via amplifier 24 and applied by capacitatively coupled diodes to the right hand grids. Each diode is therefore connected as is diode 33 in FIGURE 2. With each end of word pulse applied via amplifier 23 and line 14 to trigger 90 the count advances by one until the count reaches 15, i.e. 90, 91, 92, 93 triggers are all "On" and represent values 1, 2, 4, 8 respectively. At the end of the sixteenth word pulse the counter is once more indicating "0." The right hand anode of trigger 93 is connected by line 12 to capacitatively coupled diodes (corresponding to diode 33 in FIGURE 2) and effects reset of triggers 6 and 11 when trigger 93 switches from "On" to "Off" at the end of the sixteenth word.

The four triggers each have two anodes. Each anode is connected to a separate cathode follower 120. The cathodes of the eight cathode followers are respectively connected to matrix horizontal lines 94 to 101 and by their respective cathode loads 121 to 128 to earth. The positive line is connected via resistances 129 to the vertical lines of the matrix, namely, lines 102 to 117. The vertical lines are connected by rectifiers to the horizontal lines. The vertical lines are connected by rectifiers to the horizontal lines. The vertical lines are conected to the grids of valve 5A of their respective gates 5. The vertical lines are required to be at high voltage for this purpose and to go high one at a time in sequence.

Thus initially with counter 13 registering zero the line 102 is connected by rectifiers to lines 94, 96, 98, 100 which are connected via the cathode followers to the right hand or high anodes of triggers 90, 91, 92, 93 when in their "Off" state. All the other vertical lines are connected by a rectifier to at least one low horizontal line, so lowering the potential of the remaining vertical lines by virtue of the current drawn through their associated resistors 129.

The rectifiers are connected in a pattern representing each of the possible permutations of connections of horizontal to vertical lines. Thus, the line 94 is connected by rectifiers to lines 102 to 109, and line 95 to lines 110 to 117. When line 94 is high, line 95 is low. Hence trigger 93 governs lines 110 to 117 to be low for all counts 0 to 7, and, conversely, lines 102 to 109 to be low for all counts 8 to 15. Similarly, triggers 92, 91, 90 control lines in groups of four, two and one respectively. Thus, at the initial count of "0," triggers 90, 91, 92, 93 are all "Off" and consequently lines 94, 96, 98 and 100 are all high. Only one line 102 is not connected by a rectifier to one of the low lines 95, 97, 99, 101. When the second, or tens, denomination is to be controlled, the end of first word pulse advances the counter to count "1," thereby reversing the voltages of lines 100 and 101, and line 103 is the only line not connected by a rectifier to a low line, and hence at a potential to condition the grid of valve 5A of the tens denomination gate 5 of FIGURE 2 for conduction.

An example of the operation of the apparatus will now be described, assuming that a card having holes punches at the "7" index point in the hundreds column at the "2" index point in the tens column, and at the "5" index point in the units column, is sensed by the card sensing mechanism.

At the sensing of the "9" and "8" index points the cam contacts 7 are closed to set trigger 6 which opens gate 8 to admit an end of revolution pulse on line 9 through gate 8 to set trigger 11. In each case the setting of trigger 11 conditions the gates 5 but in the absence of the appropriate control from the triggers 4 none of the gates 5 is opened. At the sensing of the "7" index point the brush 3 relating to the hundreds column senses a hole and sets its associated trigger 4. At the same time cam 7 sets trigger 6 to open gate 8 and permit the setting of trigger 11 so that gate 5 is now conditioned from triggers 4 and 11. Gate 5 does not however open until it is further conditioned from matrix 15. The end of revolution pulse passed by gate 8 to set trigger 11 is also applied to forcibly reset the counter 13 to zero so that from the moment of receipt of this pulse the counter is driven by timing pulses over line 14 and renders a different one of the output lines of the matrix 15 operative at each count registered. On registration of a count of zero the output line controlling the gate 5 associated with the units column is rendered operative but since the trigger 4 associated with the units column is not set this gate 5 is not opened. Similarly on a count of one the line controlling the gate 5 associated with the tens column is rendered operative but again without result. On registration of a count of two the output line controlling the gate 5 associated with the hundreds column is rendered operative and since this gate, as previously explained, is already conditioned by its associated trigger 4 and by trigger 11 it is opened when the output line from matrix 15 is rendered operative.

With this gate 5 open clock pulses read off from the drum 1 and applied over line 16 pass through 5 to control the read-out gate 17 and thus permit the binary equivalent of one hundred which is currently being read out by head 10 to pass through gate 17 to the accumulator comprising the binary adder 19 and shifting register 20. Thus the binary word 1100100 preceded by twenty-five zeros is entered into the accumulator. On registration of a count of three the output line of matrix 15 controlling the gate 5 associated with the thousands column is rendered operative and the previously operative output line is rendered inoperative. As explained in connection with the counts of zero and one this has no effect upon the related gate 5 and this absence of effect is repeated at each succeeding count up to sixteen when the counter 13 produces an output pulse over line 12 to unset triggers 6 and 11.

The same sequence of events occurs when contacts 7 close upon sensing the "6" index point position, due to the fact that the trigger 4, which was set upon sensing the hole in the hundreds column at index point "7," remains set until the end of the card sensing cycle. Thus the same binary word 1100100 with its preceding zeros is fed to the adder 19 at the same time as the contents of the register 20 are circulated through adder 19 and the resultant sum of these two words is entered into the register.

Upon sensing the "5" index point position a hole is encountered in the units column and the trigger 4 associated with this column is set so that with triggers 6 and 11 set, as previously explained, by the closing of contacts 7 and the counter reset to zero count, the gate 5 associated with the trigger 4 relating to the units column is opened and clock pulses through the gate 5 permit gate 17 to pass the binary word "1" preceded by thirty-one zeros from head 10 to the adder 19.

At this time the word 11001000 previously registered is being circulated through adder 19 so that the net result is the registration of the sum 11001001 in register 20.

Upon the counter 13 registering a count of two the binary word 1100100 is again passed by gate 17 to be added to the sum then registered in register 20 to result in the registration of the binary total 100101101 in register 20.

The sensing of the "4" and "3" index point positions results in additions to the total in register 20 as were effected during the sensing of the "5" index points due to the trigger 4 associated with the hundreds and units columns remaining set. The total in register 20 thus becomes 111110111.

Upon sensing the "2" index point position a hole is encountered in the tens column and the trigger 4 associated with the column is set so that with triggers 6 and 11 set the binary word "1" is added to the total in the accumulator with the counter reset to zero, then the binary word 1010 is added when the counter is registering a count of one, and the binary digit 1100100 is added when the counter is registering a count of two. The total thus registered in the register 20 is 1001100110 after the sensing of the "2" index point position.

The sensing of the "1" index point position results in a repetition of the addition effected at the "2" index point position due to the triggers 4 relating to the hundreds, tens and units, columns remaining set so that the total registered in register 20 becomes 1011010101 which is the binary equivalent of the decimal number 725 which was to be translated. After the sensing of the "1" index point position contacts CB3 close to apply a reset pulse to all the triggers 4 in preparation for the next translation operation, the triggers 6 and 11 being reset by the output pulse from counter 13 as before.

It will be appreciated that the magnetic drum 1 is acting as a cyclic serial storage device for equivalents, so that it could be replaced by other storage devices of a similar type, such as an ultrasonic delay line.

In order to deal with non-uniform or non-decimal notations the appropriate equivalents must be available from the drum. This may be achieved by providing several tracks, each relating to one translation problem, and selecting an appropriate head or, alternatively, a single track and head may be used and the equivalents recorded on this track when required under control of a programme instruction.

It is not esssential that the input data should be in the form of a single timed impulse in each denomination. For example, decimal values could be represented in the code 1, 2, 4, 8 in each denomination. In this case each input impulse selects a binary coded equivalent corresponding to its value, or causes a single equivalent to be added in a number of times equal to the coded value of the impulse. Conversely, data represented by a single timed impulse may be converted to the equivalent in binary coded decimal instead of binary by employing a suitable accumulator and recording the equivalents in binary coded decimal form on the drum.

What I claim is:

1. Data translating apparatus comprising a source of value-representing electrical signals, occurring at discrete time instants, and each representing a different digital value according to its instant occurrence, a plurality of storage devices settable to register different denominational values of a multi-denominational value to be translated, means for applying said value representing signals from said source to set said storage devices, a source of electrical signals representing translation equivalents of digital values, means for reading out all said equivalents-representing signals in each of a plurality of translating cycles, an accumulator, gating means controlling read out of said equivalents-representing signals to said accumulator, a separate control device for each said storage device, and sequencing means for scanning said control devices in sequence in each said translation cycle, all the control devices of storage devices representing the same given digital value being effective in the same translation cycle to operate said gating means in turn under the control of said sequencing means, said given value changing in each said translation cycle and the translation of said multi-denominational number being formed in said accumulator only at the end of said translation cycles.

2. Apparatus as claimed in claim 1 in which said source of value representing signals comprising a card sensing mechanism adapted to sense successive index point positions in a card bearing data to be translated and operative at the end of a sensing cycle to reset said storage devices.

3. Apparatus as claimed in claim 1, in which said storage devices each comprise an electronic bistable trigger circuit settable to one stable state in response to a value representing signal applied thereto and in which means is provided for resetting each said trigger circuit to the other stable state after a time corresponding to the value represented by the signal applied to set said device to said one stable state.

4. Apparatus as claimed in claim 1 in which said source of equivalent signals comprises a magnetic drum storage device carrying magnetic representations of translation equivalents of at least one digital value in each denomination of the group to be translated and co-acting with first read-out means to produce electrical signals representative of said stored equivalents.

5. Apparatus as claimed in claim 4 in which said sequencing means is responsive to applied timing signals and said magnetic drum storage device also carries magnetic representations of timing signals and coacts with second read-out means to product electrical timing signals, and in which means is provided to apply said timing signals to control operation of said sequencing means.

6. Apparatus as claimed in claim 1 including a source of timing signals and in which said sequencing means is responsive to timing signals applied thereto by means associated with said source of timing signals.

7. Data translating apparatus comprising a card sensing mechanism adapted to sense successive index point positions in a card bearing data to be translated to produce value representing electrical signals at time instants within the card sensing cycle corresponding to the values of the index points sensed at such instants, a storage device for each denomination of a multi-denominational group to be translated and settable to register the digital value in the responsive denomination, means for applying value representing signals from said card sensing mechanism to set said storage devices, an accumulator, rotatable magnetic drum storage means carrying magnetic representations of translation equivalents of at least one digital value in each denomination of the digital group to be translated and coacting with first read-out means to produce electrical signals representative of said stored equivalents in each of a plurality of translation cycles, sequencing means operative in response to applied timing signals, a source of timing signals, means associated with said timing signal source for applying said timing signals to control operation of said sequencing means, and first gating means connecting said read-out means to said accumulator and controlled in each said translation cycle by said sequencing means jointly in turn with each of said storage means set to register a given value, said given value changing on successive translation cycles.

8. Apparatus as claimed in claim 7 including first driving means for said card sensing mechanism and second driving means for said magnetic drum storage device, said second driving means being operative to rotate said drum device at such a rate relative to the rate of operation of said first driving means that said read-out means reads out all said stored equivalents at least twice for each index point position sensed by said card sensing mechanism, there being one said translation cycle for each said index point position.

9. Apparatus as claimed in claim 7 in which said first read out means is operative to read out all said translation equivalents in each revolution of said drum storage means and in which there is provided drive means for said drum storage means operative to rotate said drum at least twice in the period between the sensing of successive index point positions by said card sensing means, there being one said translation cycle for each said index point position.

10. Apparatus as claimed in claim 7 including a source of pulses timed to occur at the end of each revolution of said magnetic drum means, a counter operative to produce an output signal upon registering a predetermined count, means for applying said end of revolution pulses to reset said counter to zero count, means for applying said timing pulses to drive said counter, first bistable trigger means, means for applying said end of revolution pulses to set said trigger means to one stable state, and means for applying output pulses from said counter to set said trigger means to its other stable state.

11. Apparaus as claimed in claim 10 in which said means for applying end of revolution pulses to said first trigger means comprises second gating means, and in which said card sensing mechanism includes means for generating an index point signal at each index point position sensed, there being provided means for applying index point signals to control operation of said second gating means.

12. Apparatus as claimed in claim 11 in which there is provided means for applying said index point signals to set a second bistable trigger device to one stable state in which it opens said second gating means, and means for applying said counter output signals to set said second trigger device to the other stable state in which it closes said second gating means.

13. Data translating apparatus comprising a card sensing mechanism adapted to sense successive index point positions in a card bearing data to be translated to produce value representing electrical signals at time instants within the card sensing cycle corresponding to the values of the index points sensed at such instants, a plurality of storage devices settable to register different denominational values of a digital group to be translated, means for applying value representing signals from said card sensing mechanism to set said storage devices, an accumulator, rotatable magnetic drum storage means carrying magnetic representations of translation equivalents of at least one digital value in each denomination of the digital group to be translated, magnetic representations of timing signals and a magnetic representation of an end of revolution signal and coacting with read-out means to produce electrical signals respectively corresponding to said equivalent representations, said timing representations and said end of revolution representation, sequencing means, a multistage counter operative to control said sequencing means from each stage thereof and to produce an output signal upon registering a predetermined count, means for applying said timing signals to drive said counter and thus said sequencing means, a first gate device connecting said equivalent signal read-out means to said accumulator, a plurality of of second gate devices controlling operation of said first gate device, first trigger means, a third gate device for applying said end of revolution signals to set said first trigger means, second trigger means controlling said third gate device, a source of signals corresponding in time to the sensing of said index point positions, means for applying index point signals from said source to set said second trigger means, and means for applying output pulses from said counter to unset said first and second trigger means, said second gate devices being controlled in common by said first trigger means and individually by said sequencing means jointly with individual ones of said plurality of storage devices.

14. Data translation apparatus for translating a multi-denominational number expressed in a first scale of notation into a number equivalent thereto in a second scale of notation, comprising a source of a plurality of successively occurring groups of electrical signals, each such group of signals representing the translation equivalent in said second scale of notation of a digital value within a denomination of said first scale of notation; means for reading out all said groups of signals in each of a plurality of translation cycles; an accumulator in which electrical signals may be accumulated in said second scale of notation; signal gating means controlling the application to the accumulator of the groups of translation equivalent signals from said readout means; a first source of timing signals which occur in synchronism with the groups of translation equivalent signals from said read out means; a denominational control device, with operative and inoperative states, for each denomination in said first scale of notation of the multi-denomination number to be translated; means effective to determine, for each translation cycle, the state of each denominational control device in accordance with the digit value in the corresponding denomination of said multi-denominational number in said first scale of notation; sequencing means responsive to said timing signals to apply a scanning signal to each of the control devices in turn in each said translating cycle, each control device in the operative state producing an output signal in response to the application of a scanning signal thereto; and means to apply the output signals from all the control means to said gating means to render it operative to apply a selected one of said groups of translation equivalent signals to the accumulator in response to each said output signal to form the translation in said second scale of notation of said multi-denomination number in the accumulator in a predetermined number of translation cycles by the accumulation of said selected groups of translation equivalent signals.

15. Data translation apparatus as claimed in claim 14, having a second source of timing pulses each of which occurs at the start of one of said translation cycles; a control circuit settable to a first condition and a second condition; means coupling said control circuit to all said control devices to prevent the generation of output signals by the control devices when the control circuit is in said first condition; means to apply timing signals from said second source to the control circuit to set it to the second condition in response to each such timing signal; and means responsive to timing signals from said first source to set the control circuit to said first condition.

16. Data translation apparatus as claimed in claim 15, having a counter operative to generate a carry signal in response to the application thereto of a number of input signals equal to the number of groups of translation equivalent signals which occur in each of said translation cycles; means to apply timing signals from said first source as input signals to the counter; and means to apply said carry signal from the counter to said control circuit to set it to the second condition.

17. Data translation apparatus as claimed in claim 16, in which said counter forms part of said sequencing means, and having a counter decoding device with a plurality of output lines, each of which is connected to one of said control devices; and means coupling said counter to the counter decoding device to cause a scanning signal to be produced on a different one of said output lines in response to the registration of each different count by said counter.

18. Data translation apparatus as claimed in claim 14, having means for sensing a plurality of columns of a perforated record card simultaneously, index point by index point, to generate electrical signals representing said multi-denominational number; a storage device for each said column, means to apply the electrical signals from the sensing means to the storage devices, to set each storage device in response to the sensing of a perforation in the corresponding column of the card; means coupling each storage device to a corresponding one of said control devices to render that control device operative when the storage device is set; a control circuit settable to a first and a second condition and operative to allow the application of said groups of translation equivalent signals to said accumulator only when the control circuit is in the second condition; a second source of timing signals occurring in synchronism with the translation equivalent signal groups; switching means operating in synchronism with the sensing of the record card; and means for setting the control circuit to said second condition under joint control of the timing signals from said second source and of said switching means.

19. Data translation apparatus as claimed in claim 18, having a magnetic drum storage device with a plurality of signal tracks; at least one said signal track having signals recorded therein representing said groups of translation equivalent signals; at least two of said signal tracks having timing signals recorded therein; and signal sensing means for each of said signal tracks.

20. Data translation apparatus for translating a multi-denominational decimal number into its equivalent in the binary digital notation, comprisng a source of a plurality of successively occurring groups of electrical signals, each such group of signals representing the binary number forming the translation equivalent of the decimal number 1 for each of a number of successive decimal denominations; means for reading out all of said groups of signals in each of a plurality, at least equal to nine, of translation cycles; an accumulator in which electrical signals may be accumulated in binary notation; signal gating means controlling the application to the accumulator of the groups of translation equivalent signals from said read-out means; a source of timing signals which timing signals occur in synchronism with the groups of translation equivalent signals from said read-out means; a denominational control device, with operative and inoperative states, for each denomination of the multi-denominational decimal number to be translated; means associated with each said denominational control device for setting that device to its operative condition for a period which embraces a number of said translation cycles equal to the numerical significance of the decimal digit which occupies the corresponding digital place of the decimal number to be translated so that the state of each said denominational control device is determined for each translation cycle in accordance with the digit value in the corresponding denomination of the multi-denominational number to be translated; sequencing means responsive to said timing signals to apply a scanning signal to each of said denominational control devices in turn in each said translating cycle, each control device in the operative state producing an output signal in response to the application of a scanning signal thereto; and means to apply the output signals from all the control means to said gating means to render it operative to apply a selected one of said groups of translation equivalent signals to the accumulator in response to each said output signal to form the binary equivalent of said multi-denominational decimal number in the accumulator in a predetermined number of translation cycles by the accumulation of said selected groups of translation equivalent signals.

References Cited in the file of this patent

UNITED STATES PATENTS

| | | |
|---|---|---|
| 2,533,242 | Gridley | Dec. 12, 1950 |
| 2,594,731 | Connolly | Apr. 29, 1952 |
| 2,597,866 | Gridley | May 27, 1952 |
| 2,657,856 | Edwards | Nov. 3, 1953 |
| 2,680,241 | Gridley | June 1, 1954 |
| 2,718,356 | Burrell | Sept. 20, 1955 |
| 2,810,518 | Dillon et al. | Oct. 22, 1957 |

OTHER REFERENCES

"Conversion Between Binary and Decimal Number Systems," by Mauchly "Theory and Techniques for Design of Electronic Digital Comp." Univ. of Pa., pp. 25-1 to 25-8, June 20, 1948.